XR 3,397,402

CROSS REFERENCE SEARCH ROOM 1X 5195Y

Aug. 13, 1968 H. W. SCHNEIDER 3,397,402

SYSTEM FOR DETERMINING THE LISTENING HABITS OF WAVE SIGNAL RECEIVER USERS

Filed Sept. 13, 1966 4 Sheets-Sheet 1

Henri William Schneider, Inventor

Henri Willem Schneider,
Inventor

Henri Willem Schneider,
Inventor

Aug. 13, 1968 H. W. SCHNEIDER 3,397,402

SYSTEM FOR DETERMINING THE LISTENING HABITS
OF WAVE SIGNAL RECEIVER USERS

Filed Sept. 13, 1966 4 Sheets-Sheet 4

Henri Willem Schneider,
Inventor

United States Patent Office 3,397,402
Patented Aug. 13, 1968

3,397,402

SYSTEM FOR DETERMINING THE LISTENING HABITS OF WAVE SIGNAL RECEIVER USERS

Henry W. Schneider, Voorburg, Netherlands, assignor to Intomart Instituut voor Toegepast Marklonderzoek, Hilversum, Netherlands Filed Sept. 13, 1966, Ser. No. 579,087
Claims priority, application Austria, Sept. 14, 1965, A 8,403/65; Aug. 25, 1966, A 8,089/66
16 Claims. (Cl. 346—37)

ABSTRACT OF THE DISCLOSURE

Apparatus is disclosed for registering audience tuning habits in radio or television sets. A system provides for transmission of a set of subsonic audiofrequency tone signals which turn on a recorder at the receiver to record the tones. The recorder is operated only a short time to indicate the actual transmitted signals and is turned off either by a time delay device or by a transmitted signal at the end of a code group identifying the message.

The invention relates to a method and apparatus for determining the listening habits of wave signal receiver users. It has already been proposed to rate listening densities by applying in the receiver a registering apparatus which registers the transmitter which is received by the receiver. For this purpose use is made of an indicator, which is controlled by the control knobs of the receiver and which registers on a continuously moving tape.

If different channels and networks for e.g. television are used and/or adaptation of old receivers by means of convertors is met, with this known system, it is almost impossible to deduce with certainty from the position of the control knobs which transmitter is received. In this respect it is of importance, that in the U.H.F. band very small position variations of the dial are made in tuning to another channel.

With this known system the driving speed of the tape has to be predetermined very accurately, e.g. if it has to be determined whether the receiver was on during a certain advertisement spot, which often only lasts a short time period. By reason of this high precision had to be fulfilled by the registering apparatus. Further the registering apparatus had to work continuously. This means that large quantities of registration medium such as paper or magnetic tape, were necessary.

It has also already been proposed to incorporate in the transmitted programs signals, which can operate the registration apparatus. Up till now in such systems frequencies have been used, which are outside the normal frequency band of the receiver, e.g. supersonic components for the audio channel. By reason of this receiving apparatus has to fulfill special requirements, for handling these frequencies, that normally are not reproduced. With radio receiver the use of ultrasonic frequencies is even impossible in view of the maximum available transmission band between transmitter and receiver.

The invention aims to provide a method and device with which the said disadvantages of the first described known system are completely eliminated and with which it further is possible to obtain satisfactory results without necessitating that the apparatus is able to handle frequencies outside its normal frequency band, whereas nevertheless the people listening or looking to the performance will not notice the transmitted control signals at all or only very little.

Accordingly the invention provides a method for registering listening and/or viewing habits with which a registering apparatus has been coupled to a receiver, which registering apparatus is able to register signals received by the receiver. The transmitter transmits control pulses for the registering apparatus. This method is characterized in that these control impulses, which are able to start the registering apparatus and which contain information relating to the program, are impulses of a frequency in the low frequency region of the audio frequency band, which contain at least two different basic frequencies which are not harmonics of each other. The advantages of such low frequency audio impulses are, that they do not attract attention and e.g. during applause are not noticed at all; that the control impulses only are registered if a television receiver actually reproduces the sound (without sound e.g. advertisement spots hardly can be considered to be received) and that, because a loudspeaker mostly transduces very low frequency audio signals with a relatively small efficiency into sound energy, the low frequencies of the audio signals generally represent a relatively large proportion of the electrical energy in comparison with their proportion in the sound energy.

By using more than one low frequency audio tone the possibility of false starts of the registering device in practice can be neglected especially if it is required that these tones are maintained during a predetermined time period, e.g. of one second, before the registering apparatus is started.

The invention relates as well to a method of transmission of the registration signals or receiving the signals per se as to the combination of both of these and to the devices for carrying out the method.

The registering apparatus according to the invention is characterized in that it contains a detector for detecting registration signals, which detector is devised, when receiving a predetermined registration signal which consists of a combination of at least two basic tones in the low frequency portion of the audio band, to start a recording apparatus, whereas further a switching off device is present to switch the recording apparatus off after receipt of the registration signals. Within the scope of the invention it is possible to adapt the registration apparatus to receiving during a predetermined time period after the receipt of a starting signal, in which period all registration codes can be transmitted and recorded. Further it is within the scope of the invention to transmit a switching off impulse which, after detection by the detector, switches the recording apparatus off. The method in which a predetermined period is used for activating the registration apparatus is preferred, however. When using the invention it is possible that the detector does not only start the recording apparatus but also selects the signals, which have to be registered by the recording apparatus. According to another embodiment of the invention it is possible that the detector only controls the recording apparatus and that all signals received during the working period of the registration apparatus are recorded.

As detectors in principle selective filters can be used, the outputs of these filters being preferably connected in an AND circuit, the output of which is used as starting signal for the registration device. A relatively cheap and practically sufficient reliable filter, that can be used for the low frequencies considered is the so-called double-T-filter with RC-elements.

Another embodiment of the filters, which also has proved to be acceptable consists in electro magnets having armatures in the form of elastical tongues. With this embodiment it is possible to provide the tongues with contacts and to connect these contacts in series, so that a simple circuit is created in which because both tongues oscillate with different frequencies it will be certain that at certain moments both tongues will simultaneously close their contacts. The circuit that then is closed, can directly be used for switching on the recording apparatus, e.g., a tape recorder.

When applying the invention it is of importance, that the total sound level of the used registration signals is as low as possible. For this purpose it is provided according to a further elaboration of the invention, that a number of frequencies of basic tones is used and that of this number only a considerable smaller number is transmitted simultaneously. Further in each registration apparatus it is sufficient to use filters for the frequencies of a starting signal, so that the registration apparatus contains less filters than there are useable frequencies. This is especially important, because the registration apparatuses have to be placed in rather considerable numbers for rating view- and/or listening habits.

In order to prevent false registration and/or to create the possibility of detecting a rather important proportion of the false registrations, it is provided according to a further elaboration of the invention, that each used combination of basic tones contains at least two basic tones, which are not both present in any other used combination.

Further details and advantages of the invention will be elucidated by means of the following description, which is supported by the accompanying drawing in which.

Figure 1:
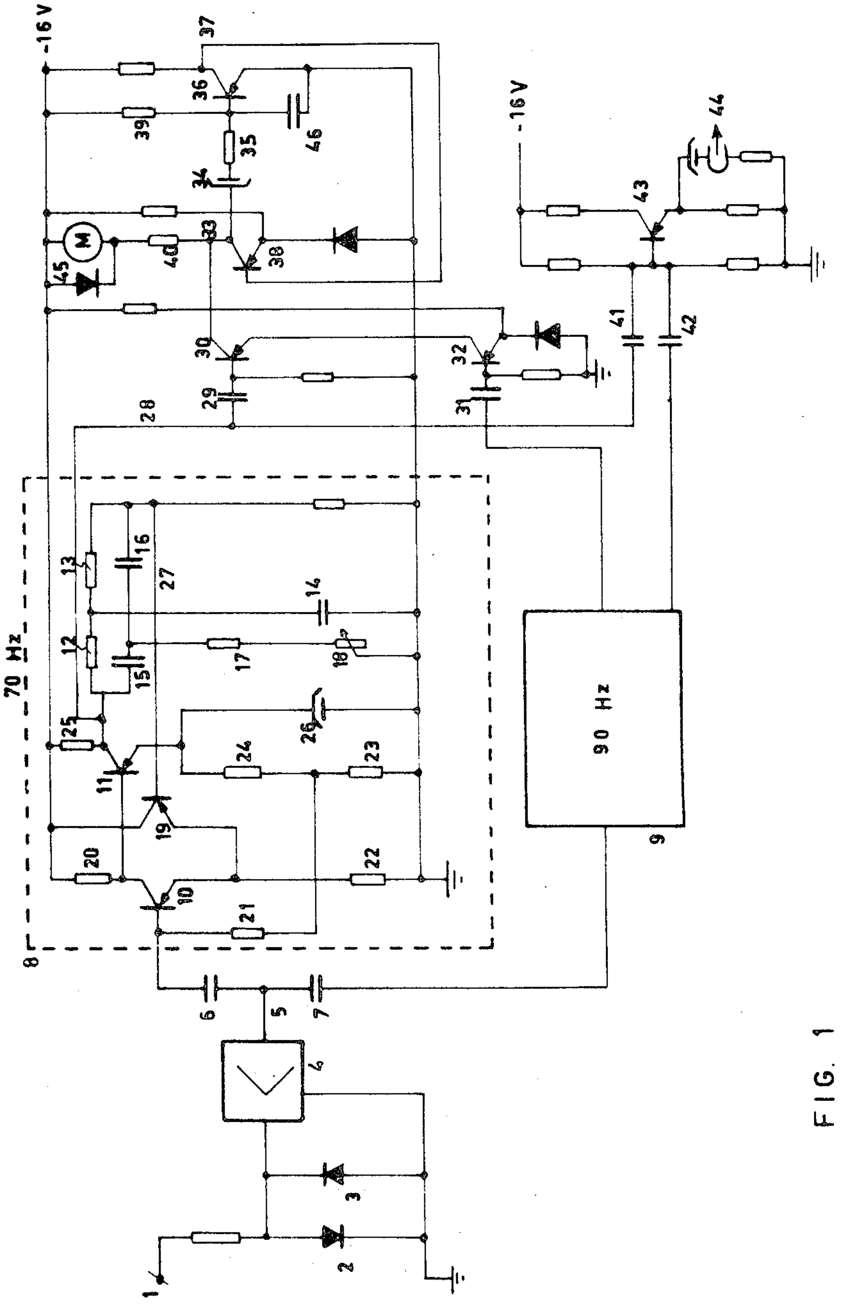
FIG. 1 shows a diagram of a first embodiment of the invention, in which use is made of electrical double T-filters.

In FIG. 1 the terminal of the loudspeaker has been indicated with the reference 1. Via a resistor the loudspeaker tension is carried to two oppositely poled limiting diodes 2 and 3 and from them to a pre-amplifier 4, the output 5 of which via condensers 6 and 7 respectively is connected to double T-filters 8 and 9 respectively. For the sake of simplicity only the components of filter 8 have been shown. Filter 9 is identical to filter 8 with the difference, that the filter 8 in the chosen embodiment has a passfrequency of 70 cycles per second and the filter 9 a passfrequency of 90 cycles per second.

Each filter 8 and 9 contains two series connected amplifier transistors 10 and 11 and a backcoupling amplifier transistor 19. The frequency-selective portion of one of the two T-sections consists of the resistors 12 and 13 and the condenser 14 and the other of the condensers 15 and 16 and the series connected resistors 17 and 18, of which 18 is adjustable and serves the purpose of fine tuning the filter.

The transistors 10 and 11 are combined (by means of resistors 20–25 inclusive and condenser 26) to a cascade amplifier, the working of which is known and needs not to be elucidated here. Via a conductor 27 and the transistor 19 which has been connected as an emitter-follower the emitter of transistor 10 receives a back coupling voltage, which suppresses all frequencies, except a relatively small frequency band near 70 cycles per second. By reason of this only a voltage of about 70 cycles per second which also was present on terminal 1 of the applied input voltage can attain a sufficient level to open periodically transistor 30 via condensor 29. In the same way filter 9 and coupling condenser 31 can only open transistor 32 if the signal applied to terminal 1 contains a component of 90 cycles per second. When both transistors 30 and 32 conduct simultaneously earth voltage is passed to point 33 which by reason of this receives a quickly rising voltage and emits a positive voltage impulse via condenser 34 and resistor 35 to the base of the normally conducting transistor 36, which is closed by this impulse. Consequently the voltage on line 37 decreases and transistor 38 starts to conduct, which fact prolongs the voltage increase of point 33. Condenser 34 starts to discharge via the resistors 35 and 39, but these elements are such dimensioned that only after a considerable time delay, e.g. five or ten seconds, the base of transistor 36 is sufficiently negative to have 36 again opened. During this period the motor M of the registration apparatus receives current via transistor 38 and the low ohmic limiting resistor 40.

The output voltages of the filters 8 and 9 also are carried via condensers 41 and 42 to the base of transistor 43, which amplifies them and transmits them to the writing head 44 of the recording device. Because motor M rotates these voltages are recorded.

When condenser 34 has been discharged sufficiently to make transistor 36 conducting again, the voltage on line 37 rises and transistor 38 stops conducting by reason of which the motor M is not energized further. The voltage which is generated by the motor when it rotates somewhat further on, is mainly carried off via diode 45. The remaining ripple voltages are passed via condenser 34 to the base of transistor 35, but have so little energy, that they can be carried off by condenser 46.

The normal load and bias resistors and diodes, which have been shown in FIG. 1 are connected in known ways and need not to be discussed here. Their electrical value and circuits are in a known way dependent on the used type of transistor.

The working of the device described is the following: After that terminal 1 has received a voltage which contains sufficiently strong components of 70 and 90 cycles per second, motor M is started and remains energized during the time period determined by elements 34, 35 and 39. In this period the head 44 records signals of 70 and/or 90 cycles per second. These signals are in the form of a series of impulses of 70, 90 cycles per second and/or combinations of both these frequencies, so chosen such that they can be identified by means of the record. After this RC-combination 34, 35, 39 switches off the motor M.

If the program should contain by accident simultaneously components of 70 and 90 cycles per second of sufficient duration and strength to start the motor M (which fact is per se already very improbable) the seconds following in the program probably will not contain a series of pulses of 70 and/or 90 cycles per second, which could be used for identification of the program, so that in practice such a false record will not involve a false program identification.

Figure 2:
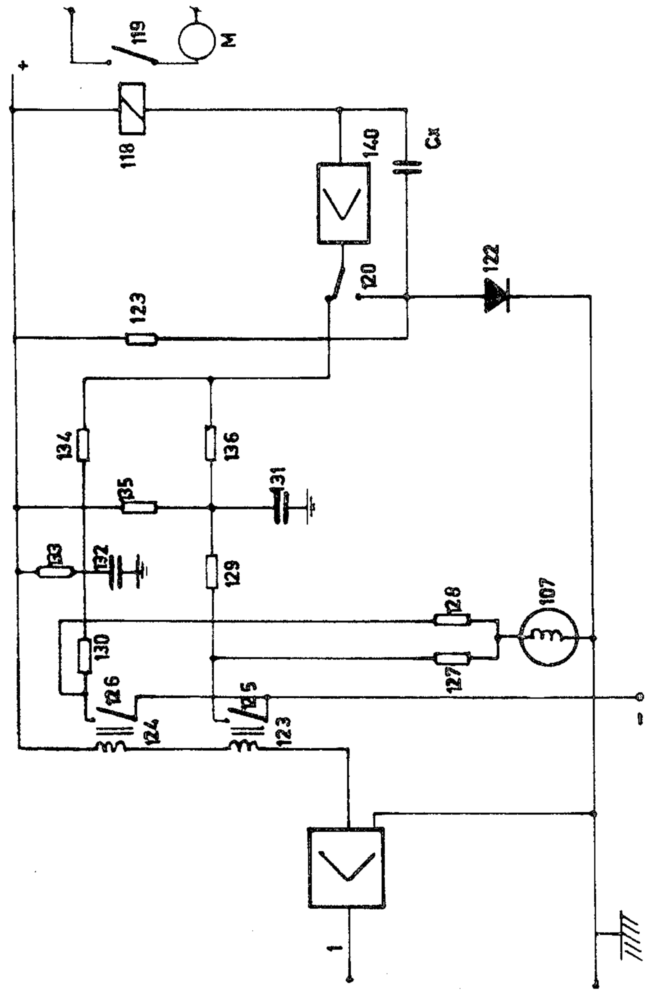
FIG. 2 shows an embodiment of the invention, in which use is made of electro-mechanical relays having tuned tongues as bandfilters.

In FIG. 2 the pre-amplified loudspeaker voltage is connected to two electromagnets 123 and 124 in series, of which the armatures are magnetisable tongues 125 and 126 which are tuned to a frequency of 90 and 70 cycles per second respectively. These tongues are connected to the negative feeding terminal and can cooperate with contacts, which via resistors 127 and 128 can transmit voltage to a recording head 107 of the recording device, the other side of which has been connected to earth. The tongue-contacts 125 and 126 are each connected via a smoothing circuit consisting of resistors 129 and 130 and condensers 131 and 132 respectively to the central point of a voltage divider, which consists of resistors 133 and 134 or 135 and 136 respectively. When the tongue-contacts 125, 126 are not closed the voltage which via resistors 133, 134 and 135, 136 respectively and contact 120 is fed to the input of the amplifier 140 and is insufficient for having the output current of 140 energizing relay 118. If the voltage fed to the electromagnets 123 and 124 contains a component of 70 cycles per second the tongue contact 126 will intermittently close, by reason of which a voltage is fed to the connection point of 133 and 134, which voltage is determined by the closure time in comparison with the interrupting time of the tongue contact 126 and the dimensioning of the resistors 130, 133 and 134. These quantities are such chosen, that relay 118 is not energized. If, however, simultaneously the tongue contact 125 closes periodically because a component of 90 cycles per second is present, the voltage of the input of 140 is lowered, until relay 118 is energized via 140. Because the closure period of the tongue relays above a predetermined energizing level is rather well defined, in this way a reliable working can be obtained, with which only if both tongue-contacts are actioned the relay 118 is switched. When this happens, contact 119 is closed, which closes the energizing circuit of the motor M. Simultaneously contact 120 is reversed, after which the amplifier 120 receives a sufficient negative input voltage from the charge of condenser C*x*.

After that the charge of condenser C*x* has leaked off via resistor 123, relay 118 is deenergized and contact 120 is reset in its original position. The positive voltage impulse created by this passes through C*x* and is limited by diode 122 to earth voltage level. In the period that relay 118 is energized, motor M rotates and the record head 107 registers signals of 70 and/or 90 cycles per second, received via resistors 127, 128.

Figure 3:
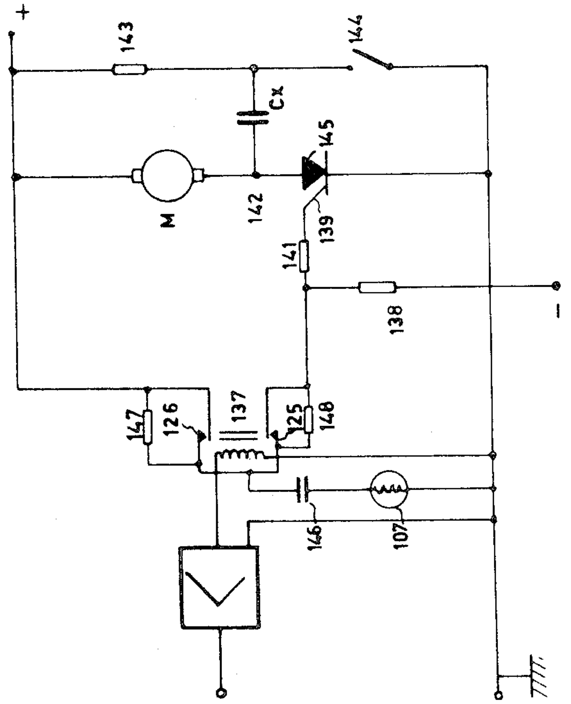
FIG. 3 shows another embodiment of the invention, in which some simplifications are introduced with respect to FIGURE 2.

In FIG. 3 the output of the pre-amplifier is connected to an electromagnet 137, which cooperates with the tongue contacts again indicated by 125 and 126 which have been tuned at 70 and 90 cycles per second. The tongue contacts are series connected at one side with the positive feeding terminal and at the other side via a resistor 138 with the negative feeding terminal. Consequently the voltage which via resistors 138, 148 and 147 is fed to the control electrode 139 of a thyristor 145, is negative. If, however, both tongue contacts 125 and 126 close periodically, necessarily the situation will occur in which both contacts are closed simultaneously. In that instance the voltage on electrode 139 rises very fast, so that thyristor 145 is fired. Motor M, which is the driving motor of the recording apparatus is then energized. When this motor is energized the voltage at point 142 is lowered from the positive feed voltage to about earth voltage. By reason of this, condenser C*x* begins to charge via resistor 143. After the motor M has rotated a predetermined period, e.g. five seconds, contact 144 is closed. This can e.g. be done by a strip of aluminium or another conducting material on the tape, e.g. a magnetic tape, of the recording apparatus, which is driven by motor M. The closure of contact 144 causes a fast discharge of condenser C*x*, by reason of which a negative voltage impulse is fed to point 142 and thyristor 145 is extinguished. In the meantime the information signals have come to an end so that in no instance the situation will be present in which both tongues 125 and 126 oscillate, so that the voltage on electrode 139 is sufficiently negative to prevent immediate refiring of thyristor 145. If the tongues 125 and 126 oscillate the voltage variations generated by these oscillations are via a condenser 146 fed to the recording head 107. In order to prevent sparking the tongue contacts have been bridged by resistors 147 and 148.

The device of FIG. 3 has the advantage of being very simple, but a mechanical contact on the tape drive is necessary. With the simple scheme shown a sufficient security is obtained for preventing that contact 144 is still closed, when motor M has stopped. Even if this should happen motor M should be energized again when electrode 139 becomes positive. In any case shortly after this contact 144 will open, after which the charging of condenser C*x* occurs in the normal way. In this instance the starting condition of the charging should be that the right hand plate of the condenser is at earth voltage, but C*x* and 143 are such dimensioned, that also in this case C*x* is sufficiently charged for disrupting the current through thyristor 145, if contact 144 again is closed.

The working of the devices as described will be clear. At certain moments in radio and television programs a series of impulses are transmitted, of which the first one contains the selection frequencies also in the embodiment shown components of 70 and 90 cycles per second. When a receiver is receiving the program the recording apparatus is started and all further impulses of 70 or 90 or both 70 and 90 cycles per second are recorded. Then the record stops until a further series of the said impulses is received. After termination of the investigation period, e.g. a week, the recorded results, e.g. in form of a magnetic tape, are fed to a central handling station in which the magentic tapes are read in a selection apparatus, which again registers whether the significant frequencies are present on the tapes and if so, in which sequence. This handling station can work at a far higher speed than the registration apparatus, e.g. a 100 times faster, in which case the significant frequencies are 7,000 and 9,000 cycles per second. The handling station contains circuits selective for these frequencies. A further advantage of the invention is, that the information obtained in this way, can be carried on line to a computer for data processing. By reason of this the number of men hours for processing the dates is a minimum. When applying the known system mentioned in the beginning, however, it will be very difficult to carry on the obtained information directly to a computer.

Figure 4:
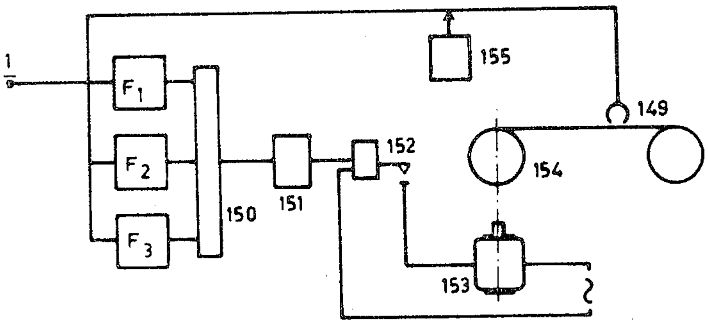
FIG. 4 shows schematically a further embodiment of the invention.

In the embodiment that schematically has been shown in FIG. 4 reference 1 again shows the loudspeaker terminal being the input of the registration apparatus. 149 is the recording head which continuously is connected to the loudspeaker voltage. The loudspeaker voltage is also fed to three filters F1, F2, F3, the outputs of which are connected to an AND-gate 150. The output of the gate 150 is connected to a timing device 151, which is devised for closing switch 152 during a predetermined period which is sufficient for receving a complete signal series, if the output of the AND-gate 150 is energized longer than a predetermined period, e.g. one second. The timing circuit energizes a relay circuit 152, which of course can be an electronic switching circuit. Closure of 152 energizes motor 153, which drives the tape recorder 154. The device according to FIGURE 4 has proved to give good performances when used with six basic tones of 57, 66, 75, 84, 93 and 107 cycles per second respectively. Of these the combinations shown in the following table been used in which table a 0 indicates the absence and a 1 indicates the presence of the related base frequency.

| | Basic tone frequency (Hz.) | | | | | |
|---|---|---|---|---|---|---|
| | 57 | 66 | 75 | 84 | 93 | 107 |
| I | 0 | 1 | 0 | 1 | 0 | 1 |
| II | 0 | 0 | 0 | 0 | 0 | 0 |
| III | 0 | 0 | 1 | 0 | 1 | 1 |
| IV | 0 | 0 | 1 | 1 | 0 | 0 |
| V | 0 | 1 | 0 | 0 | 1 | 0 |
| VI | 1 | 0 | 0 | 0 | 0 | 1 |
| VII | 1 | 0 | 0 | 1 | 1 | 0 |
| VIII | 1 | 1 | 1 | 0 | 0 | 0 |

Of the eight combinations I–VIII inclusive the first one, I, serves the purpose of starting the recorder. The others can be used in the information code which represents the program registered.

It will be clear, that only combinations of two or three basic tones have been used. Consequently the signal level of each basic tone may be one-third of the allowable total signal level of the registration signals. If for instance also the combination was present, which contains all six basic tones, the signal level of each basic tone could be only one-sixth of the allowed total signal level. Further there are always two disturbing frequencies necessary for causing a faulty registration. In this instance it is remarked, that the loss of a frequency is extremely unlikely to occur so that in practice only the case has to be considered that frequencies are added by disturbances or by their presence in the program. When considering this it will be clear, that the unwanted occurrence of a single added base tone frequency never can create doubts about the combination transmitted and that always a straight forward correction is possible in that instance.

Figure 5:
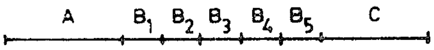
FIG. 5 shows a time diagram of a signal series used with the device according to FIGRE 4.

The time diagram of FIGURE 5 shows at A the starting signal, at B1–B5 inclusive the information impulses and at C the free end space. In the starting signal always the combination I is present. In the portion C no information signal is transmitted.

When processing the record it is advantageous to decode the records when displaying them in the reverse direction. Consequently the display head firstly cooperated with section C which is blank, after this sections B5, B4, B3, B2 and B1 and finally section A. In order to be able to determine with certainty the transfer from section C to section B5 for section B5 the code combination II, which consists only of zeros, cannot be used. The transfers between the other periods, which transfers can be used as clockpulses, can always be determined, if two succeeding periods do not contain the same combination. Finally it is also desired that period B1 contains a combination different from the starting combination I. The displaying of the tape record occurs in a tape displayer which is connected to filters tuned to the six basic frequencies.

Also with this embodiment of the invention it is possible to display the records at a far higher speed than the record was made. The relative bandwidth of the filters, necessary for distinguishing the base tones, remains still the same.

Because the recording apparatus 154 is used only briefly after its start, and because further it is very difficult to predetermine exactly the velocity of the tape, even if synchronous motors are used, a measuring frequency is fed to the head 149 by means of a device 155. The mains frequency is always present in radio and television receivers on many places, often as an undesired humming tone. In this last instance the device 155 may be superfluous whereas it is also possible to apply a filter and/or an impedance circuit for preventing that the frequency delivered by 155 reaches the loudspeaker. The frequency of 155, preferably the mains frequency or a multiple of it, can be filtered out when processing the record and used for controlling the velocity of the tape when it is displayed.

The above example of chosen basic tone frequencies and the combinations used serves solely the purpose of elucidation. It has been shown that in this way sufficient information can be transmitted when the transmittance time of a starting signal and the information covers only a few seconds and that faulty registrations are eliminated almost completely. The chosen frequencies in the region of about 50–110 cycles per second have proved to be very useful. When they are received on about the minimum level that easily can be detected they give rise to sound energies, which are hardly perceptable (solely a listener who knows at which moment a signal series has to be received perceives them) whereas these frequencies nevertheless are within the normal frequency band of the audio apparatus of a television receiver or that of a radio receiver.

What I claim is:

1. A system for registering tuning habits of wave signal receiver users, comprising in combination, means transmitting intelligence signals upon which are superimposed at times registration signals in the form of at least two different tone signals in the low frequency portion of the audio frequency band, over a predetermined time span encompassing a plurality of cycles, means receiving both said intelligence and registration signals and producing therefrom audio signals, means separating said registration signals from said audio signals, recording means, means activating said recording means in response to predetermined ones of said registration signals, and means for recording the registration signals for a limited time period following said predetermined ones of the recording signals.

2. A system as defined in claim 1, wherein the transmitting means includes apparatus producing the registration signals in the form of an initial signal containing a predetermined combination of different tones and a subsequent signal containing a different combination of different tones.

3. A system as defined in claim 1, wherein the transmitting means includes apparatus producing the registration signals in the form of a combination of tone frequencies with at least two different signal portions each including a different combination of less than all of said tone frequencies.

4. A system as defined in claim 3, wherein the apparatus produces signals of six separate tone frequencies, and said apparatus produces said different signal portions with no more than three of said tone frequencies.

5. A system as defined in claim 3, wherein the apparatus produces a plurality of signal portions each having a combination of tone frequencies containing at least two tone frequencies not present in any other signal portion combination.

6. A device according to claim 1, including a record input terminal, provided with means for supplying a measuring frequency signal, such as the main frequency or a multiple of it, to the record input.

7. Registration appartus for recording the tuning habits at a wave signal receiver comprising in combination, means in said wave signal receiver reproducing audio signals and registration means coupled to said wave signl receiver comprising at least two tuned filters for detecting the presence of at least two corresponding basic tone frequencies in the low frequency portion of the audio frequency band, an AND-circuit connected to the outputs of the filters, recording apparatus provided with starting means, and means connecting said starting means with the output of the AND-circuit for response to the presence of said two corresponding basic tone frequencies to start said recording apparatus.

8. Registration apparatus as defined in claim 6, wherein said filters comprise at least one electromagnet and at least two armatures mounted in the magnetic field of said at least one electromagnet, which armatures each form part of a selectively tuned mechanical oscillation system and each is provided with a contact set, the said contact set being connected to said AND-circuit.

9. Apparatus according to claim 8, having two armatures, the respective contacts of which are connected in series and an in turn series circuit with said starting means for said recording apparatus.

10. Apparatus according to claim 9 provided with a thyristor that is mounted in said starting circuit for said recording apparatus, said thyristor having a control electrode which is connected directly with said series circuit of said armature contacts.

11. Apparatus according to claim 8 in which each armature consists of an elastic tongue provided with a contact.

12. Apparatus according to claim 11 in which at least two tongues are mounted in a magnetic field of a single electro-magnet.

13. Apparatus according to claim 7 provided with an electrical delay circuit, charging means for said delay circuit, which are adapted to charge said delay circuit when said recording apparatus is switched on, means for connecting said delay circuit with said recording apparatus and means for switching off said registration apparatus which latter means are adapted to be actioned by said delay circuit.

14. Apparatus according to claim 13, in which said starting circuit of said recording apparatus contains a relay, and said AND-circuit is connected to the coil of said relay, said relay having a further contact in the said starting circuit which further contact is mounted to disconnect said AND-circuit from the control circuit, when the relay is energized, means being present for replacing the connection between said AND-circuit and the energizing circuit of the coil by a connection with said delay circuit.

15. Apparatus according to claim 7, in which said registration apparatus is provided with mechanical contact means, time delay means connected to operate said contact means a certain period after said registration apparatus has been started, and switching off means for said recording apparatus actuated by operation of said contact means.

16. Apparatus according to claim 15, including a fixed voltage terminal, a thyristor and a motor driving the recording apparatus connected to said thyristor, in which a series connection of a resistor and a condenser is connected at the one hand with the connection between the thyristor and the motor of the recording apparatus and at the other hand with the fixed voltage terminal, means including a contact operable in response to the motor being connected to the connection point of the resistor and the condenser and to the other side of the thyristor.

References Cited

UNITED STATES PATENTS

| | | | |
|---|---|---|---|
| 2,513,360 | 7/1950 | Rahmel | 325—311 |
| 2,766,374 | 10/1956 | Hoffmann | 346—37 |

RICHARD B. WILKINSON, *Primary Examiner.*

JOSEPH W. HARTARY, *Assistant Examiner.*